Dec. 31, 1946.  D. R. BOMFORD  2,413,429
IMPLEMENT OR MACHINE FOR HOEING
Filed Sept. 23, 1944  2 Sheets-Sheet 1

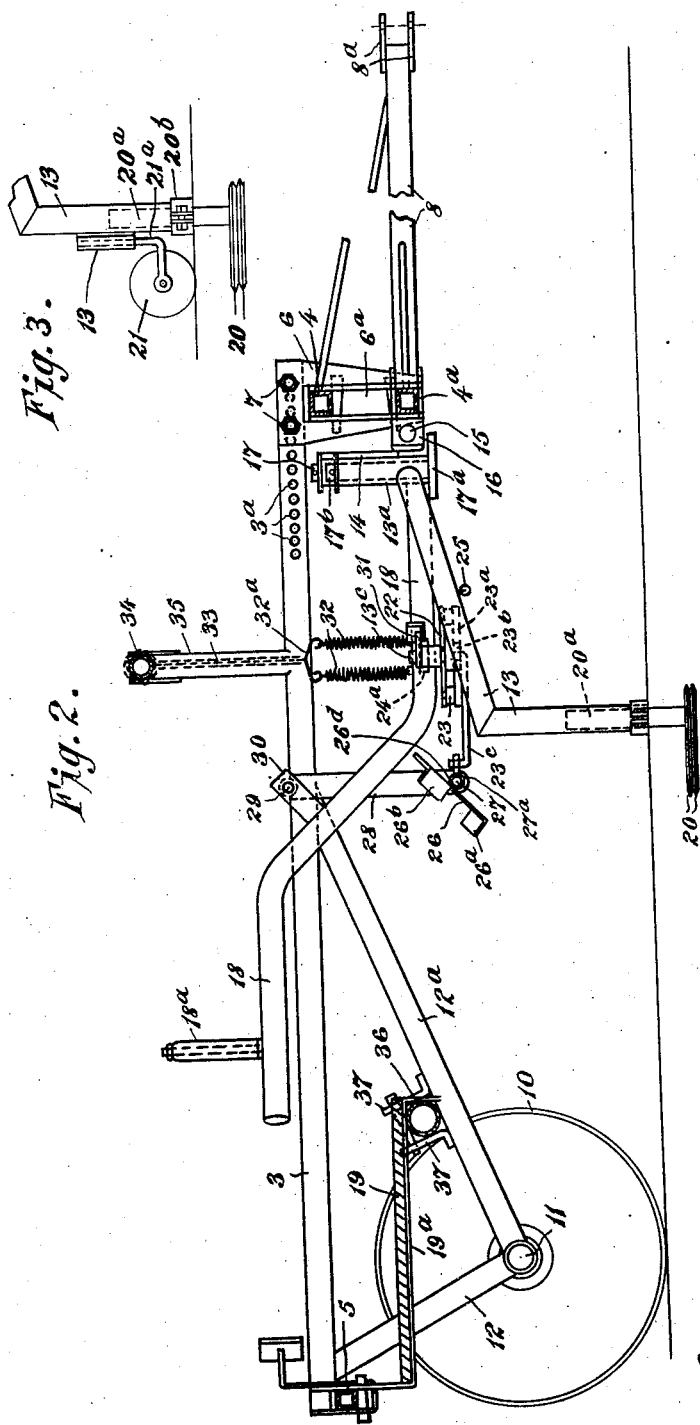

Patented Dec. 31, 1946

2,413,429

UNITED STATES PATENT OFFICE 2,413,429

IMPLEMENT OR MACHINE FOR HOEING

Douglas Raymond Bomford, Pitchill, near Evesham, England

Application September 23, 1944, Serial No. 555,511
In Great Britain November 18, 1943

7 Claims. (Cl. 97—154)

This invention has reference to implements or machines employed in hoeing operations and in order that the invention may be the better understood I remark that in the hoeing of land on which the crop under cultivation is sown or planted in wide rows and with the plants in the respective rows set at fairly wide intervals apart the hoeing of the land which becomes necessary or desirable from time to time during the raising of a crop involves two distinct operations, namely one whereby the weeding and loosening of the earth between the successive rows is effected, which is known as inter-row hoeing, and the other, technically known as inter-plant hoeing, whereby the hoeing operation is effected on the strips of earth which separate each successive plant in a row.

The inter-row hoeing is commonly performed by a horse or tractor drawn implement and the inter-plant hoeing by hand tools, but it has been proposed to effect the inter-plant hoeing by an implement or machine embodying inter alia two members so pivotally mounted on a traversable frame and having operating means associated therewith that they can be swung towards and away from each other, each of the said members being furnished at its lower or acting end with a horizontally, or substantially horizontally, disposed blade or share proper which projects therefrom in the direction of the middle longitudinal plane between the members the length of the said blades or shares being such that their inwardly presented ends normally somewhat overlap so that the blades co-act to afford a continuous cutting edge between the members.

In the use of such inter-plant hoeing implements or machines the machine is traversed along the row to be hoed with the two blade-carrying members disposed one on each side of the row and the co-acting blades lying in overlapping relationship across the row so that in the forward motion of the machine they shear the weeds and loosen the soil between the plants, and as the blades come up to each successive plant in the row the actuating mechanism is operated so as to swing said members outwardly or to such position relative to each other that the blades are thereby moved from their overlapping condition and a gap is formed between their inner or presented ends so that they can be steered past the stems of the plants without liability to the severing of the plants from the roots thereof.

The present invention has for its object to provide an inter-plant hoeing implement or machine simple and economical in construction and whereby the performance of the hoeing operations can be effected with considerably greater facility and efficiency than with such implements as heretofore constructed or proposed.

The invention resides in an implement or machine for the purpose aforesaid characterised broadly in that the arms or members which carry the horizontal or substantially horizontal blades or shares proper are operated for effecting the requisite relative motions of the said blades or shares when the implement or machine is in use, through the medium of pedal actuated mechanism, the said pedal actuated mechanism having in association therewith hand operable means for steering the blades into and maintaining them in the desired path between the plants during the traverse of the machine.

The invention further resides in certain details of construction of parts of the mechanism hereinafter described and in the implement or machine as a whole, whether designed to operate on a single row only on each traverse of the machine, or, by providing a duplication or multiplication of the parts such as are hereinafter described on a common supporting frame, to operate on a plurality of adjoining rows on each traverse of the machine.

A convenient embodiment of the invention will be further and more particularly described with reference to the accompanying drawings, wherein:

Figure 1 represents in plan an inter-plant hoeing machine embodying improvements in accordance with the present invention and wherein the machine is designed to operate on three rows for each traverse of the machine, two of the mechanisms provided for effecting the hoeing operations being shown in the said figure, the third being broken away in view of the limitation imposed on the size of the sheet, portions of the frame members hereinafter referred to being also broken away for the same reason.

Figure 2 is a side elevation, partly in section and viewed in the direction of the arrow in Figure 1.

Figure 3 is a fragmentary view, showing a portion of one of the tines and a caster wheel for supporting it.

Figure 1:
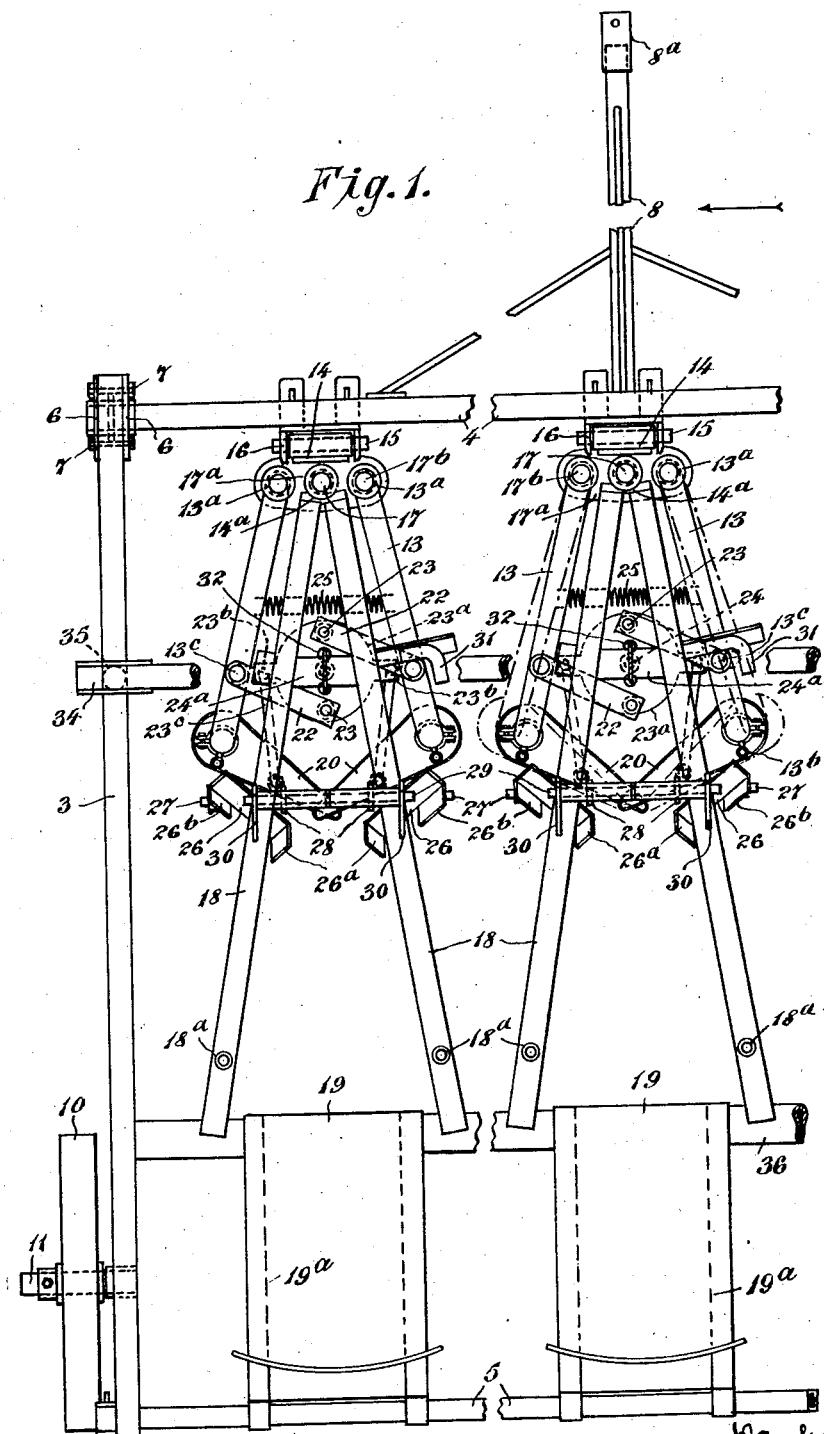

In the embodiment of the invention illustrated the frame structure or carriage of the machine and whereon the plurality of pairs of blade carrying arms and their operating mechanisms are mounted for effecting the traction thereof is of rectangular formation and embodies longitudinally extending side members denoted by the reference 3 and one only of which is seen in the plan Figure 1 the other being broken away, the said longitudinally extending bars being interconnected at their front and rearward ends by transverse bar members denoted respectively by the references 4 and 5, all the said members being conveniently fabricated from appropriate lengths of L or other suitable section bar metal.

Where L section bars are employed in the fabrication of the frame structure each longitudinal and transverse member of the frame may embody two such bars so disposed relative to each other that the said members are of a rectangular tube-like formation in cross section.

The front transverse bar member 4 may be adapted for a longitudinally adjustable attachment to the front end parts of the side bar members 3, as for example by locating and fixing the respective ends of the said transverse member 4 in the upper ends of vertical slots $6^a$ in pairs of bifurcated plates 6 arranged one on each side of the said bars 3 and constituting brackets or arms thereon for the attachment to the carriage of parts hereinafter described, the said plates 6 having in their upper parts two holes which can be brought into coincidence with two of the series of holes $3^a$ provided in the front end parts of the members 3, screw bolts 7 passed through the coincident holes securely fixing the bracket plates in the adjusted position on the bars.

The front end of the traversable frame structure has a secondary transverse bar member $4^a$ associated therewith the respective ends of the said member $4^a$ being fixed in the lower ends of the slots $6^a$ of the bracket plates.

The frame structure or carriage may be furnished at its front end with means for the connection thereto of draught horse chain gear but preferably the machine is adapted for tractor operation for which purpose and as shown in the drawings it is provided with a forwardly extending draw bar 8 disposed in the middle longitudinal plane of the carriage the said bar having means at its front end, such as the pair of perforated plates $8^a$ whereby it is adapted for a vertical pivotal connection with an appropriate part on the tractor or a suitable hitch associated therewith. The rearward end of the said bar 8 is rigidly attached to the transverse member $4^a$ of the frame structure and the bar is braced to the said member $4^a$ and to the transverse member 4 by rods such as 9.

The rearward end of the frame structure or carriage is supported on travelling wheels 10 which may be mounted on a continuous axle, or as shown in the drawings, on stub axles 11 carried by the inclined bar members 12, $12^a$ fixed to and depending from the underside of the longitudinal bars 3 of the carriage.

Each arm 13 of the pair comprised in the hoeing mechanism, or in each such mechanism where more than one is provided on the carriage, is constituted by a crank-like member, the said crank-like members which may be formed from a single piece of appropriately bent metallic tubing, or, as shown in the drawings, from two connected pieces of tubing, being disposed in vertical planes and extending longitudinally rearwardly from their connection as hereinafter described with a plate or bracket 14 having a swivel mounting on a horizontal spindle 15 mounted in bearings provided by lugs 16 carried by the lower front transverse bar $4^a$ aforesaid of the carriage or frame.

The said swivelling plate or bracket 14 is furnished on its rear face with a tubular portion $14^a$ the axis of which is vertical and which affords a bearing for a pin or spindle 17 carrying a horizontally disposed plate $17^a$ to which the front ends of a pair of handles 18 associated with the mechanism for effecting the steering thereof, are fixed.

The spindle 17 is retained in the bearing 14 by a cotter pin passed through the upper end of the spindle which projects above the bearing tube.

The steering handles 18 may be constituted by a pair of tubular rods which extend rearwardly in divergent relationship to each other and are so upwardly bent or inclined that their rear ends are brought to a convenient location to be gripped by the hands of an operator occupying a seat 19 provided at the rearward end of the supporting frame or carriage of the machine.

The said steering handles 18 are preferably furnished at or adjacent their rear ends with upwardly projecting short rods $18^a$ fitted with a sleeve of rubber or other suitable non-metallic material to afford convenient grips for facilitating their operation.

The swivelling plate $17^a$ is provided with a pair of upwardly projecting pins $17^b$ disposed symmetrically on each side of the spindle 17 which carries the said plate, with which pins tubular parts $13^a$ on the front ends of the respective arms 13 have a swivelling connection, and the said arms extend rearwardly and divergently from their pivotal connections with the bracket $17^a$ so that their rear ends at which the cranked portions depend vertically are at a greater distance apart than the front ends thereof.

The normal degree of divergence of the swivelling arms 13 and the length of the blades 20 which are mounted on and project horizontally, or substantially horizontally, inwardly from the lower ends of the vertically depending parts of the arms are such that the inner ends of the blades lie in overlapping relationship and co-act as is well understood to provide a continuous cutting edge while the mechanism is traversed between one plant and the next in the row in the working of the machine.

The blade-like members or shares proper 20 may be fixed to the depending cranked portions of the arms 13 by the provision on the respective blades of a vertical cylindrical projection $20^a$ of a diameter proper to fit into the tubular lower ends of said arms and to provide for an adjustable setting of the said shares the lower portion of the depending parts may be slit vertically at one side thereof and the lower ends be furnished with a collar $20^b$ having a slit therein coincident with the slit in the tube, the parts of the collar adjoining the slit having outwardly projecting lugs through coincident holes in which a screw bolt is passed, the tightening up of a nut on the said bolt serving very securely to clamp the blades in any position to which they may be adjusted on the ends of the arms 13.

The arms 13 are preserved in their normal degree of divergence relative to each other as seen in full lines in Figure 1 and are adapted to be moved or swung from such condition for the purpose of carrying their blades or shares 20 out of overlapping relationship as indicated in dotted lines on the right-hand mechanism in Figure 1 so as to form a gap between the blades which permits them to pass the stems of the plants in the forward traversing of the machine, by the provision in association with each arm 13 of a bar or link 22 which has a pivotal attachment to or abutment against a pin or stud 13c on the arm, the links associated with the respective arms projecting inwardly in oppositely inclined directions and their inner ends having a pivotal connection with lugs or projections 23 disposed at diametrically opposite points on a plate or disc 23a which is furnished, on a diameter at right angles to that on which the lugs 23 are disposed, with laterally extending arms 23b which are respectively in operative connection through rods 23c with pedal actuating mechanism mounted on the steering handles as hereinafter described.

The said armed plate or disc 23a is adapted to turn on a central vertical axis or pivot 24 mounted in a bearing carried by a cross bar 24a fixed in suitable location between the handles or rods 18, and a coil spring 25 which interconnects the arms 13 at points between their front ends and the points thereon with which the links 22 connecting said arms with the disc or plate have pivotal connection, co-operates with the said disc and links in maintaining the arms in their normal condition.

The pedal actuated mechanism provided for effecting the turning motions of the armed plate or disc 23a in one or other direction for moving the arms 13 from the normal condition to the relative positions for forming the gap between the blades embodies two plate-like members 26, one for supporting and taking the pressure of each foot of the operator, the said plate-like members having upwardly bent parts 26a and 26b at their rear ends and outer side edges respectively for locating the foot thereon and preventing its slipping from the pedal.

Each plate-like member 26 has a swivel mounting on a laterally projecting pin 27 provided at or adjacent the lower end of a bar 28 and the upper ends of the said bars 28 have a swivel mounting on a horizontal rod 29 extending between the steering rods and carried in bearing brackets 30 appropriately located on the respective handles 18.

Each swivelling pedal plate 26 is connected through the medium of the rods or wires 23c aforesaid with the outer end of the respective side arms 23b of the rotatable plate 23a with which the arms 13 have the link connections aforesaid, the rear end of each wire 23c having a swivel connection with a lug 26d on the respective pedal and its front end a similar connection with the arms 23b on the rotatable plate 23a, and it will be appreciated that by exerting pressure of the foot on one pedal, the left hand pedal when the parts are arranged as shown in the drawings, and relaxing the pressure of the right foot on the right hand pedal the disc 23a will be turned in a direction which acts to move the arms 13 to the relative positions for affording a gap between the blades or shares 20, while pressure by the right foot and the relaxation of pressure by the left foot will turn the disc in the reverse direction thus bringing the arms back to their normal condition, the spring 25 which has been expanded by the outward turning of the arms assisting in the return of the parts to the normal condition.

Any steering of the mechanism which may be requisite due to the successive plants in the row not being in strict alignment is effected by swinging the steering handles 18 in one or other lateral direction on their front end pivot 17 according to the direction and extent of the steerage necessary and the connection which the said handles 18 have with the disc 23a linked to the respective arms 13, co-operates with the motion which is given to the arms through their connection with the plate 17a which turns angularly with the steering handles to effect the corresponding steerage action of the arms and the blades or shares carried thereby.

One of the steering handles 18 is, or may be, furnished with a stop such as 31 to co-act with a projection on the adjoining arm, conveniently the pin or stud 13c thereon, to limit the outward swinging motion of the arms 13 when the machine is in operation.

The weight of the arms 13 and the other parts associated therewith for their operation and the steerage of the machine may be borne by a spring suspension of the parts from the main frame or carriage, a suitable spring suspension embodying a pair of coil springs 32 the lower ends of which are attached to convenient anchorages on the aforesaid cross bar 24a carried by the steering arms or handles 18, the upper ends of said springs being attached to an interconnecting member 32a fixed to the lower end of a chain 33 the upper part of which is looped around a rod 34 extending transversely above the frame or carriage, its respective ends being mounted on pillars or standards 35 provided on the longitudinal side members of the frame or carriage.

The chain connection of the springs 32 with the rod 34 affords a ready means of adjusting the height of the suspended parts relative to the ground level in order to compensate for the varying degrees of downward pressure which may be exerted on the handles and pedals by operators of different physiques.

In lieu of this spring suspension of the arms 13 and associated parts, the vertical limb of each arm 13 may, as is illustrated in Figure 3, have a travelling wheel 21 mounted thereon, the mounting of this wheel being effected by providing the vertical limb of the arm with a tubular part 13b in which the vertical part of a cranked rod 21a carrying the wheel fits and turns so that the wheel can swivel caster-wise.

Where a plurality of hoeing mechanisms is mounted on the frame or carriage a separate seat 19 may be provided for each operator or the seat may be made continuous from side to side of the carriage or frame and the said seat or seats may be supported on the frame by metallic bars or strips 19a the rearward ends of which are upwardly cranked and connected to the rear end cross member 5 of the frame, the front ends of the said bars or strips being downwardly cranked and having a bearing or lodgment on a rod 36 which extends transversely across the frame its respective ends resting on the downwardly inclined bars or rods 12a aforesaid and being located and fixed between brackets such as 37 provided on the said bars or rods 12a.

It will be appreciated that considerable variation in details of construction of the parts described may be made without departing from the nature of the invention.

An implement or machine in accordance with this invention may readily be adapted for the performance of hoeing operations close up to the respective sides of a row, or rows, of plants wherein the plants are set so closely that hoeing between the successive plants by the machine is impracticable, such adaptation being effected by the provision for use in association with the pairs of blade or share carrying arms of means whereby they can be temporarily fixed at such degree of divergence relative to each other that a gap of any predetermined size is maintained between their inner or presented ends. Convenient means for the said purpose may be constituted by a rod or bar of appropriate length and the ends of which are adapted for engagement with pins or studs suitably located on the respective blade-carrying arms, so that the rod or bar extends transversely between the arms to maintain them at the requisite degree of divergence.

I claim:

1. A machine for inter-plant hoeing, comprising a traversable frame, a pair of arms connected thereto to move laterally thereof and carrying blades movable by the lateral movements of said arms into overlapping cutting relation and into separated relation, and pedal actuated means connecting said arms for simultaneous lateral movements thereof in relatively opposite directions to bring the blades into said cutting and separated relations.

2. A machine for inter-plant hoeing, comprising a traversable frame, a pair of arms connected thereto to move laterally thereof and carrying blades movable by the lateral movements of said arms into overlapping cutting relation and into separated relation, and pedal actuated means comprising a pair of pedals, and means connecting said arms and pedals for simultaneous lateral movements of the arms to bring the blades into overlapping cutting relation by operation of one of the pedals, and for simultaneous lateral movements of the arms to bring the blades into separated relation by operation of the other pedal.

3. A machine for inter-plant hoeing, comprising a traversable frame, a pair of arms connected thereto to move laterally thereof and carrying blades movable by the lateral movements of said arms into overlapping cutting relation and into separated relation, and pedal actuated means comprising a pair of pedals, a rotatably mounted member having links connected to its diametrically opposite sides and to the respective arms, and links connected to other diametrically opposite sides of said member and to the respective pedals for rotating said member by operation of one of the pedals to bring the blades into cutting relation and for rotating said member in an opposite direction by operation of the other pedal to bring the blades into separated relation.

4. A machine for inter-plant hoeing, comprising a traversable frame, a pair of arms pivotally connected thereto for swinging movements laterally of the frame, blades mounted on the respective arms to swing therewith into overlapping cutting relation and into separated relation to form a gap between them, pedal actuated means for swinging the arms laterally in relatively opposite directions to bring the blades into one or the other of said relations, and manually operated means for swinging both of said arms toward one or the other side of the frame for steering the blades, embodying a pair of handles pivoted on said frame to swing laterally thereof and carrying said pedal actuated means for swinging said arms thereby.

5. A machine for inter-plant hoeing, comprising a traversable frame, a pair of arms pivotally connected thereto for swinging movements laterally of the frame, blades mounted on the respective arms to swing therewith into overlapping cutting relation and into separated relation to form a gap between them, pedal actuated means for swinging the arms laterally in relatively opposite directions to bring the blades into one or the other of said relations, and manually operated means for swinging both of said arms toward one or the other side of the frame for steering the blades embodying a pair of handles pivoted on the frame to swing laterally thereof and connected to said arms, and a rod extending between and connecting the handles, said pedal actuated means comprising a bar suspended from said rod, and a pair of pedals pivotally mounted on said bar.

6. A machine for inter-plant hoeing, comprising a traversable frame, a pair of arms pivotally connected thereto for swinging movements laterally of the frame, blades mounted on the respective arms to swing therewith into overlapping cutting relation and into separated relation to form a gap between them, pedal actuated means for swinging the arms laterally in relatively opposite directions to bring the blades into one or the other of said relations, and manually operated means for swinging both of said arms toward one or the other side of the frame for steering the blades, said arms and manually operated steering means being connected to the frame for relative raising and lowering movements, and a spring suspension mounted on said frame and yieldingly supporting said arms and steering means.

7. A machine for inter-plant hoeing, comprising a traversable frame having a seat thereon for the operator, a pair of arms pivotally connected to the frame to swing laterally thereof and carrying blades movable by the lateral swinging movements of the arms into overlapping cutting relation and into separated relation to form a gap between them, a pair of handles pivotally connected to the frame to swing in unison laterally thereof and extending to a position adjacent to the operator's seat, a pair of pedals pivotally supported by the handles adjacent to the operator's seat, mechanism carried by the handles and operatively connecting said arms for simultaneous lateral swinging movements thereof in relatively opposite directions to swing the blades into cutting or separated relation, means connecting one of the pedals to said mechanism to operate the latter to swing the blades to cutting relation when said pedal is operated, and means connecting the other pedal to said mechanism to operate the latter to swing the blades to separated relation when said other pedal is operated.

DOUGLAS RAYMOND BOMFORD.